May 26, 1931.  C. H. WEBSTER  1,806,774
MACHINE FOR REWINDING WEBS OF PAPERS APPLICABLE FOR SIMILAR PURPOSES
Filed Aug. 5, 1927  7 Sheets-Sheet 1

Patented May 26, 1931

1,806,774

UNITED STATES PATENT OFFICE

CLARENCE HAMMOND WEBSTER, OF LONDON, ENGLAND, ASSIGNOR TO R. W. CRABTREE & SONS, LIMITED, OF LEEDS, ENGLAND, A JOINT-STOCK CORPORATION OF GREAT BRITAIN

MACHINE FOR REWINDING WEBS OF PAPERS APPLICABLE FOR SIMILAR PURPOSES

Application filed August 5, 1927, Serial No. 210,957, and in Great Britain August 13, 1926.

This invention relates to apparatus for rewinding or re-reeling webs of paper or other material from remnant reels in order that the remnant reels may thus be utilized by being successively joined and rewound into a new reel which in being rewound may if desired be simultaneously cut or slit into any number of narrower width reels.

The invention has among its objects to permit of the operation to be expeditiously and conveniently performed and to avoid the use of heavy spindles upon which the remnant webs or reels are successively mounted for rewinding or re-reeling.

According to the invention the tubular cores of straw board, metal or the like of remnant reels to be rewound or re-reeled, are carried at their respective ends upon a pair of rotatable cones oppositely disposed in alignment, which are respectively carried by pedestals that are adapted to have a transverse movement imparted to them to permit of the tubular cores being mounted in position upon the cones, or of the tubular cores being withdrawn, and to permit of the remnant reel, when mounted in position, being moved or adjusted transversely according to the position at which the web is to be rewound upon the new reel. Thus, according to the invention, the respective pedestals, while being adapted for independent transverse movement required for the mounting and withdrawal of the remnant reels, are adapted to be moved together for the transverse adjustment or lay of the web in rewinding.

According to the invention, moreover, the rotatable cones are so mounted that the thrust by which the tubular core is held by the cones is transmitted through interposed springs.

The invention comprises the constructional features which are hereinafter described.

The application of the invention is illustrated, by way of example, in the accompanying drawings, in which:

Figures 2a and 2b are views in a front elevation of the mechanism for supporting and adjusting the position of the remnant reels in the machine according to Figure 1b.

Figure 3 is a side elevation corresponding to Figure 2a.

Figures 4a and 4b are views in side elevation of the re-reeling mechanism of a modified construction of machine according to the invention.

In carrying the invention into effect according to the construction represented in Figures 1a to 3 of the accompanying drawings, I provide the machine frame with a base $a$ and two parallel lateral frame parts $b$ by which the respective rolls, spindles and other parts may be supported, and between which the web may pass from the front where the remnant reel is mounted for unwinding to the rear where the web is rewound; and at the front, I mount upon the same base or upon a special bedplate $c$ two upstanding pedestals $c^1$ that are adapted to have movement imparted to them to a determined extent for the purposes described, while the adjacent parts $b$ of the machine frame may be adapted at $b^1$ for the support of a sling yoke $d^2$ by which the remnant reel $d$ to be rewound may be brought into position; while at the rear of the machine a pair of parallel disposed drums $e$ are provided for the support by and between them of the reel $f$ in rewinding, means being provided by which movement is imparted to both of the drums in the manner hereinafter described; while the adjacent ends $b^2$ of the parallel lateral frame parts $b$ are provided of a substantially uniform cross-section or otherwise adapted to provide machined surfaces to serve as guides for the respective bearing brackets $f^1$ in which the respective ends of the spindle of the rewound reel may be carried, means being provided by which the spindle may be easily inserted in or withdrawn from the brackets, the brackets $f^1$ being adapted, for example, to open in a horizontal direction to permit the spindle to pass outwards or inwards. It will be understood that, as the web in being rewound increases in diameter, the brackets $f^1$ move upwardly, the respective brackets being advantageously adapted to be suspended by means of flexible members $f^2$ in the manner hereinafter described. The respective parallel lateral frame parts $b^2$ may also serve for the reception of the respective bearing brackets $g^1$ by which a spindle $g$ carrying any number of toothed cutter discs $g^2$ may be mounted, and while the spindle $g$ upon which the cutter discs are mounted may be free to move upwardly as the reel $f$ increases in diameter, means may be provided by which the respective brackets may be fixedly secured in any position when the cutter discs are not required for use. It will be understood that the cutter discs $g^2$ are mountable in any required transverse position upon their spindle $g$ so as to cut the web that is being rewound, into webs of any required width, the web being cut on the mere rotation of the reel and under the weight of the cutter spindle and the brackets by which it is supported, the cutters, spindle and brackets riding on top of the rewound reel as the latter increases in diameter, cutting the web simultaneously, in such a manner as to eliminate any subsequent interleaving or binding.

In a middle position, rolls $h, h^1 j$ may be mounted over which the web may pass, and an electric motor $i$ may be mounted beneath by which movement may be imparted by chain or other drive $i^1$ to the spindle of one of the rolls $e$ upon which the reel $f$ is supported in being wound, movement being imparted to the second drum from the first by chain or other gear $i^2$. The lateral frame parts $b$ may be so provided as to carry in a middle accessible position the roll $j$ disposed parallel to the respective axes of the remnant roll $d$ and the reel $f$ that is to be wound and adapted to operate as a tension roll, and for the purpose the respective lateral frame parts may be adapted for the reception of self-aligning bearing blocks or bearing block parts $j^1$ for the reception of the ends of the tension roll spindle, above and beneath which spiral springs $j^2$ may be mounted which are capable of adjustment from above and below by means of screw-threaded spindles $j^3$ at the outer ends of which hand wheels are provided; these various parts thus enabling the tension roll to be adjusted at will as regards strength of spring, and also to be run out of level in order to take up slack at the edge of badly wound reels.

Beneath the tension roll $j$ is disposed the roll $h$ which is a stationary but freely mounted spiralled pipe roll beneath which the web passes from the remnant reel $d$ and by which any creases in the web may be smoothed out, the web thence passing upwardly over the top of the tension roll $j$ and thence downwardly to a second roll $h^1$, also a stationary but freely mounted spiralled roll, which may be conveniently mounted at a position adjacent the innermost drum $e$ of the pair of drums upon which the reel is wound, the web thence passing over the first drum and thus being wound on the reel. These two stationary pipe rolls $h, h^1$ are so set in position before and after the tension roll $j$, as to ensure the line of pull of the latter to be always in the same plane, no matter what the diameter of the remnant reel. They are conveniently formed with a double spiral rib of inconsiderable depth and which starts at the middle of the roll and extends in both directions outwardly to the ends. Such rib may be formed by means of narrow strips of paper applied to the surface of the roll by means of an adhesive. Alternatively, shallow grooves may take the place of the ribs before referred to.

The lateral frame parts $b$ are also conveniently adapted for the reception of spindles $k, l$ at the front and rear of the machine upon which capstan drums $k^1, l^1$ may be mounted, and the spindles or the drums may be operable by hand operated worm and worm wheel gear $k^2, l^2$ for rotating the drums $k^1, l^1$ in either direction. The lateral frame parts at the front and rear are adapted for the reception of pulleys $b^3, b^4$ over which flexible members may respectively pass from the respective drums referred to. At the front wire ropes or other flexible members $d^1$ may serve to carry the hook fitting or yoke $d^2$ by which the remnant reel $d$ may be supported on one or a number of slings for bringing it into position in line with the axes of the cones by which the tubular core of the remnant reel may be engaged, while at the rear the wire ropes or other flexible members $f^2$ are adapted for the raising and lowering of the spindle brackets $f^1$ carrying the rewound reel, the wire ropes being provided with means for disconnection from the spindles. The said brackets may be provided with means by which they may respectively be fixedly secured in any position, as for example, when the web has been completely wound on the reel and it is desired to roll out the spindle and the reel.

At the front of the apparatus the upstanding pedestals $c^1$ are mounted upon a machined bedplate $c$ after the manner of the movable tailstock of a lathe, the bedplate having extended within it a boss $c^2$ integral with the pedestal $c^1$ through which passes a lead screw $c^3$ that extends within the bedplate and is carried therein in suitable bearings, with thrust bearings. This lead screw is provided in two sections both of which are screw-threaded in the same direction and connected together in a central position in the bedplate by a spring clutch $c^4$, the two parts of which are respectively longitudinally movable upon the respective parts of the lead-screw and are mounted under the action of helical springs. At both ends of the bedplate a clutch operating lever $m$ is provided by which the spring clutch is operated. Each lever $m$ has two positive positions for engagement and disengagement of the clutch respectively and operates the clutch through a pivoted link $m^1$, an operating rod $m^2$ and a fork $m^3$ fixed to the said rod $m^2$. It will be understood that the pedestals $c^1$ are permanently set upon the lead-screw $c^3$ and are moved inwardly or outwardly on the rotation of the screw-threaded spindle in one direction or the other. At the ends of the bedplate, operating gear $n$ is provided for causing the movement of the pedestals. Each of the gears may be operated by a hand wheel $n^1$ by which movement may be imparted to the respective sections of the lead-screw or through the clutch to both sections of the lead-screw, so that thus if the clutch parts are engaged, the respective pedestals may be caused to move together by the operation of either operating gear, or when the clutch parts are dis-engaged, either pedestal alone may be moved on operation of its operating gear. Further, by means of the machined bedplate, lead-screw and gear, the pedestals may be moved inwards to take any width of reel from the maximum width of the machine to the narrowest reel commonly used without impairing the rigidity of the machine in any way.

The respective pedestals $c^1$ are provided at their upper ends with capped bosses for the reception of spindles $o$ mounted in roller bearings and provided with ball thrust bearings. On the inner end of each spindle a boss or flanged fitting $o^1$ is mounted adapted for the reception of a cone $o^2$. The cone is conveniently fluted and in addition provided with stops or otherwise, in order to engage with corresponding ends of the metal or other tubular core carrying the remnant of the reel, and at the rear the cone is provided with an outwardly extending flange $o^3$ by which it may be secured upon the boss or fitting $o^1$ mounted upon the spindle referred to. The flange of the cone may be provided of the same diameter as the flange provided on the boss or fitting on which it is carried by transversely disposed bolts $o^4$ passing through coincident holes in the respective flanges. The boss or fitting on its inner face is provided with an outwardly extending circular boss of small diameter that is adapted to enter into a concentric circular recess provided on the outer face of the flange $o^3$ of the cone. Recesses may be provided in the adjacent faces of the flanges $o^3$, $o^1$ of the cone and the boss or fitting, by which spiral springs $o^5$ may be carried in position between them and advantageously upon the bolts $o^4$. By such means the cone $o^2$ is normally thrust outwards under the influence of the spiral springs and thus an elastic resistance is imposed between the pedestal $c^1$ and the cone on the cone engaging the tubular core of the remnant reel. On the opposite ends of the cone spindles to that on which the cone is mounted, brake wheels $p$ may be provided and brakes of the kind usually employed for applying resistance to the unwinding of webs from a reel in rotary printing presses, the brake shoes $p^1$ being supported upon levers pivoted upon links or fittings carried by the pedestals and being applied to the wheels $p$ by hand-operated screw gear. The cones $o^2$ are conveniently provided to be interchangeable so that cones of a size suitable to a particular diameter of tubular reel core may be brought into use.

It will be understood that in operation, in unwinding a web from a remnant reel and rewinding it upon another reel, the two parts or sections of the lead-screw $c^3$ may be connected in the manner described by which the pedestals are both engaged so that rotation of either of the hand wheels, by which the gear is operable, will result in both pedestals and the reel held between them moving in side lay to the right or to the left and thus enabling even ended reels to be built up from a succession of web remnants. When a web remnant has been completely run off, one of the movable clutch parts is disengaged and the hand wheel on either side is rotated, whereby the adjacent pedestal may thus slide outwardly to enable the tubular core to be removed and another remnant reel to be inserted. The same hand wheel is then rotated in the opposite direction whereby the pedestal is caused to slide inwards again and thus the corresponding cone is forcibly and tightly thrust into the tubular core of the reel. The movable clutch member is again engaged and both pedestals with the reel between them are then adjusted in side lay to register with the reel being built up.

It will be understood that in the case of steel cores of varying length, gaps are provided between the cones and their supports and the elastic resistance is imposed between them by the spiral springs referred to. Thus, the clutch can always be engaged no matter what the variation in length of the steel cores.

Figure 1A:
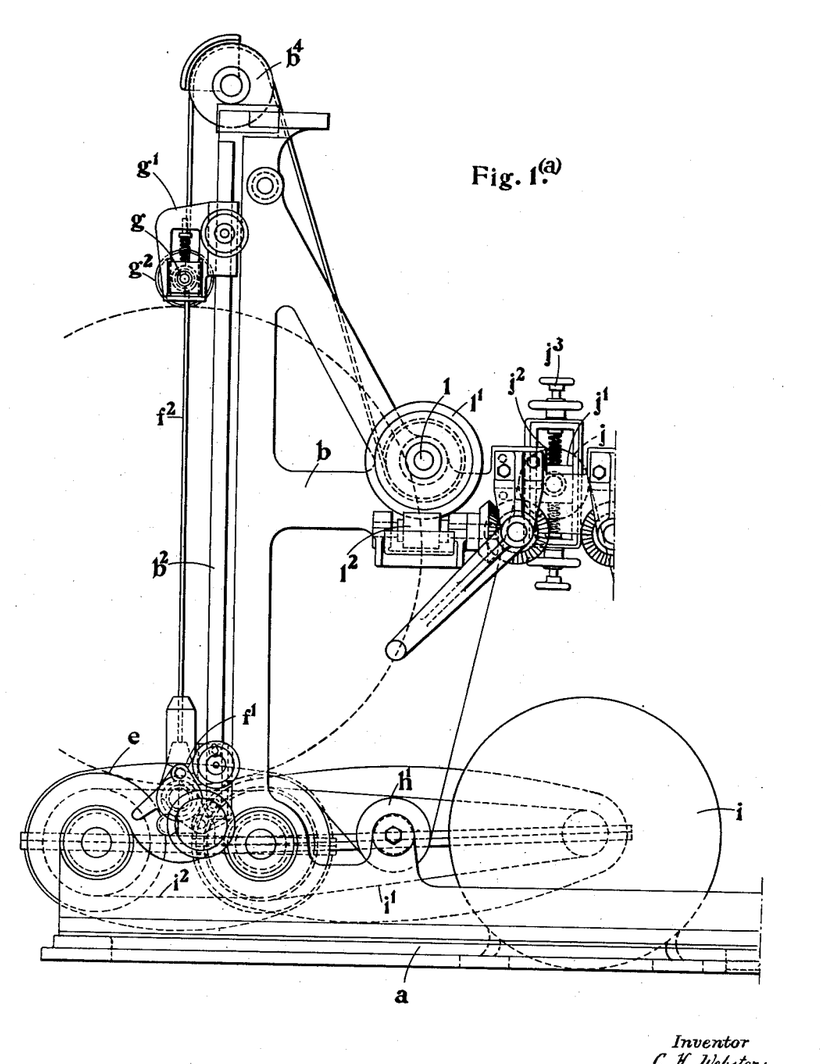
Figures 1a and 1b are views in side elevation showing the re-reeling mechanism of a machine provided according to the invention.
Figure 1B:
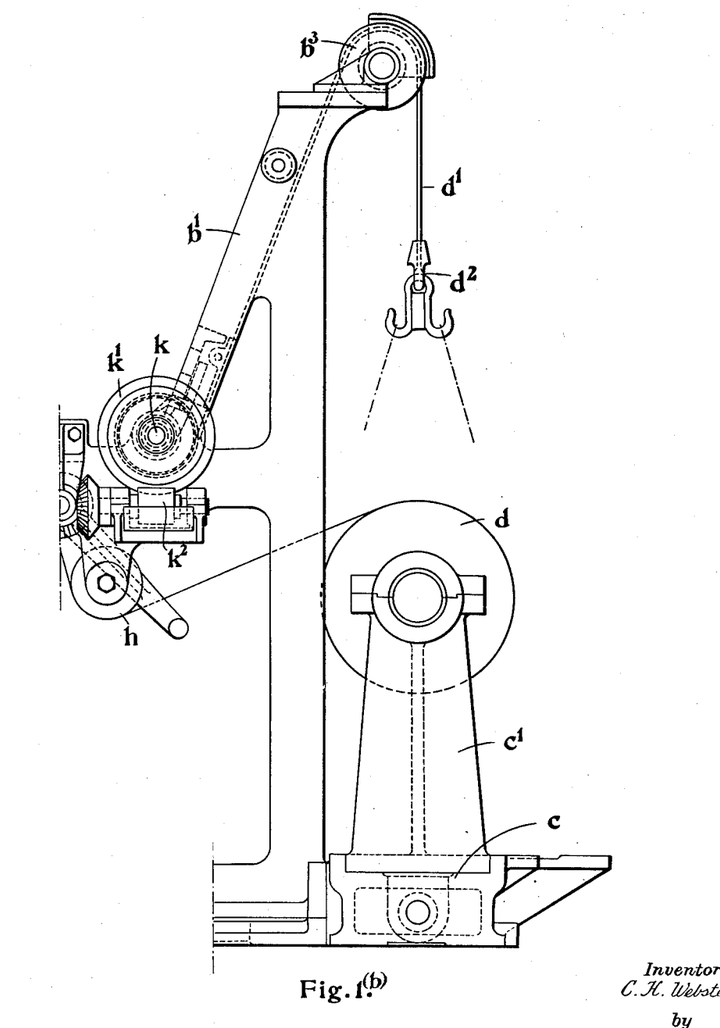
Figures 2, 4, 7:
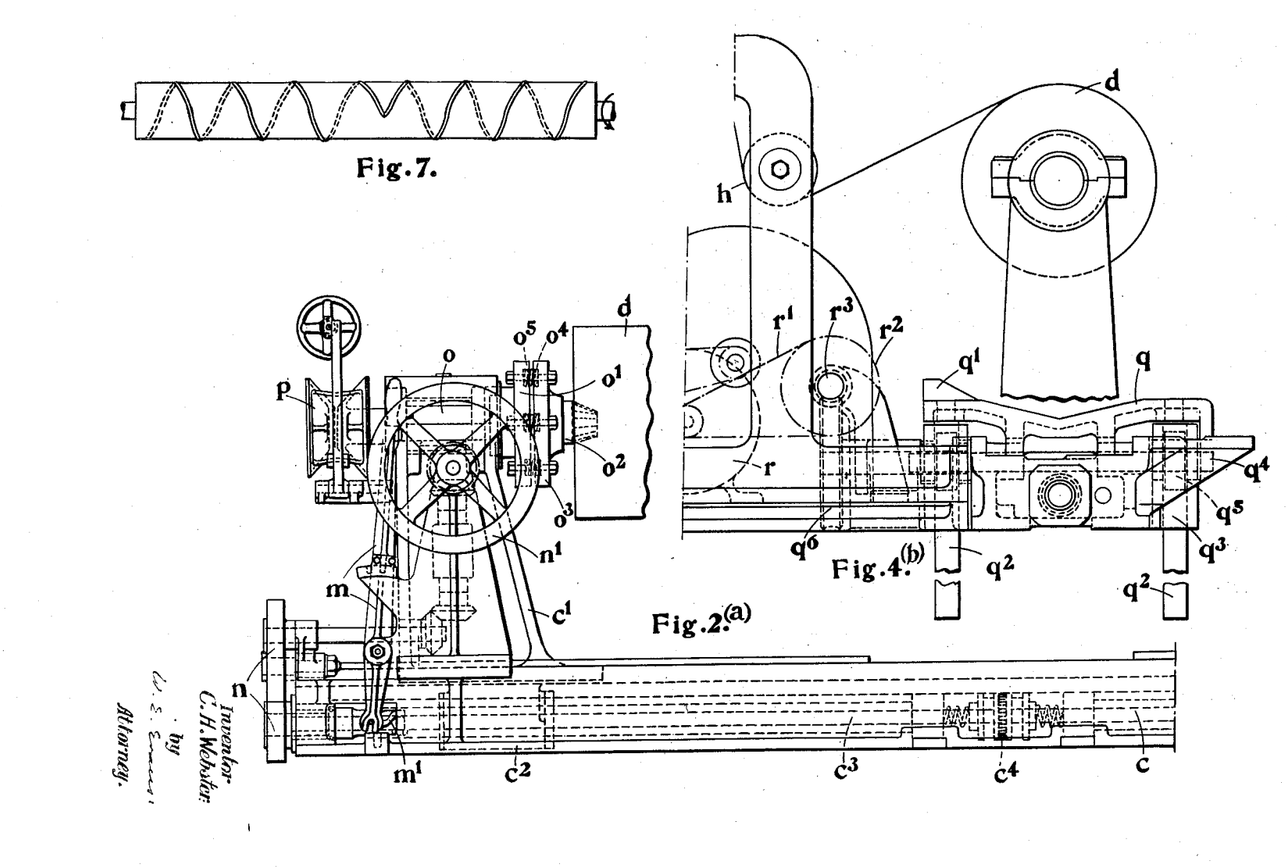
Figure 2B:
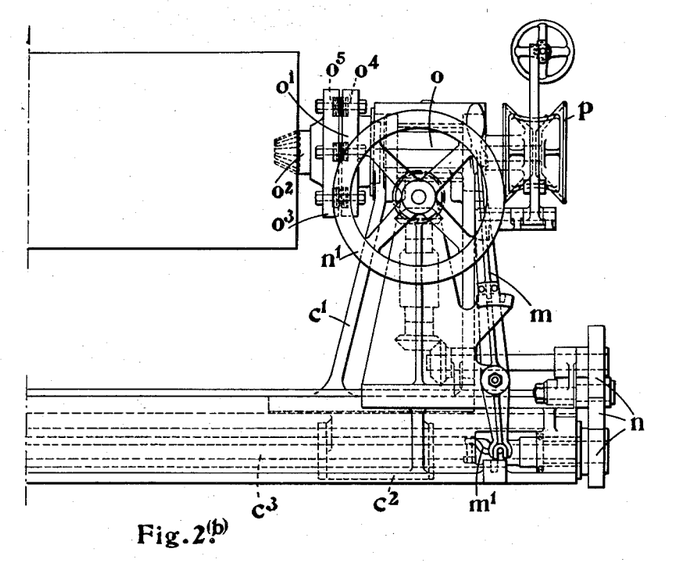
Figure 3:
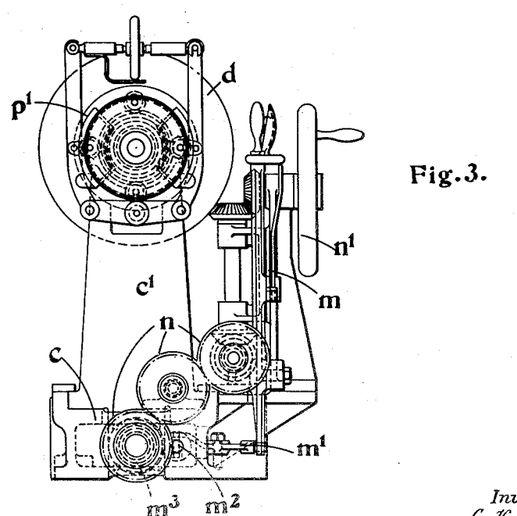
Figure 4A:
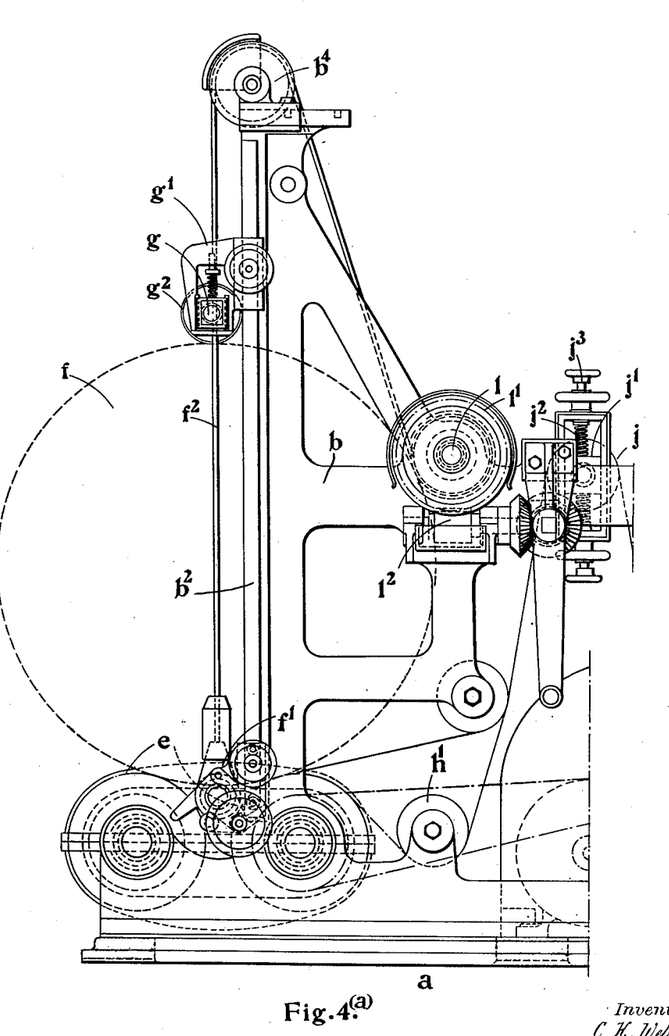
Figure 5A:
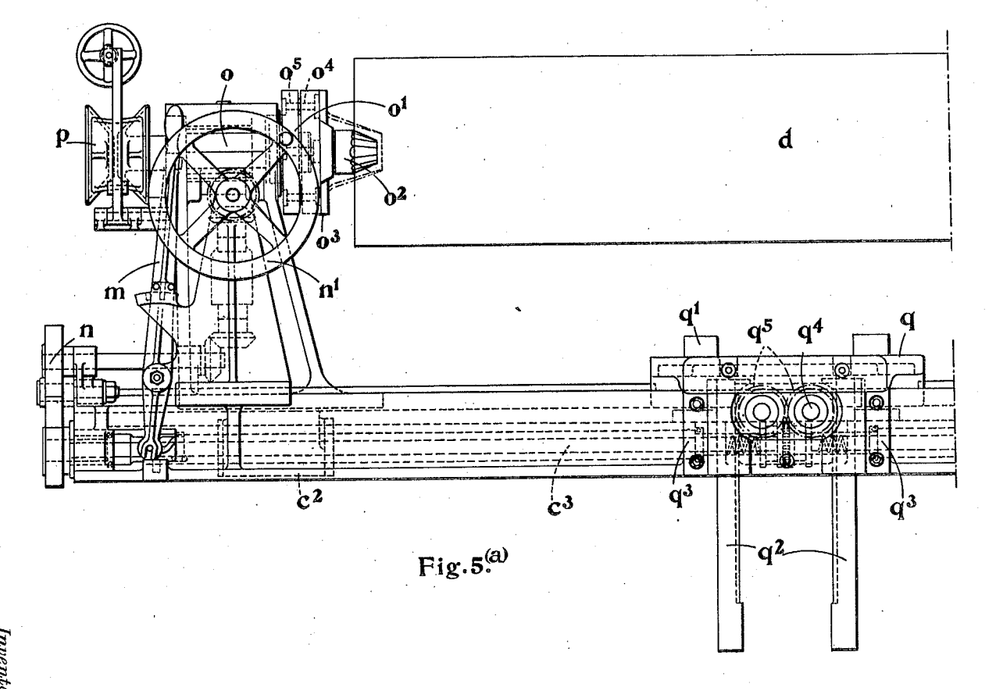
Figures 5a and 5b are views in front elevation of the mechanism for supporting and adjusting the position of the remnant reels in the machine according to Figure 4a and 4b.
Figure 5B:
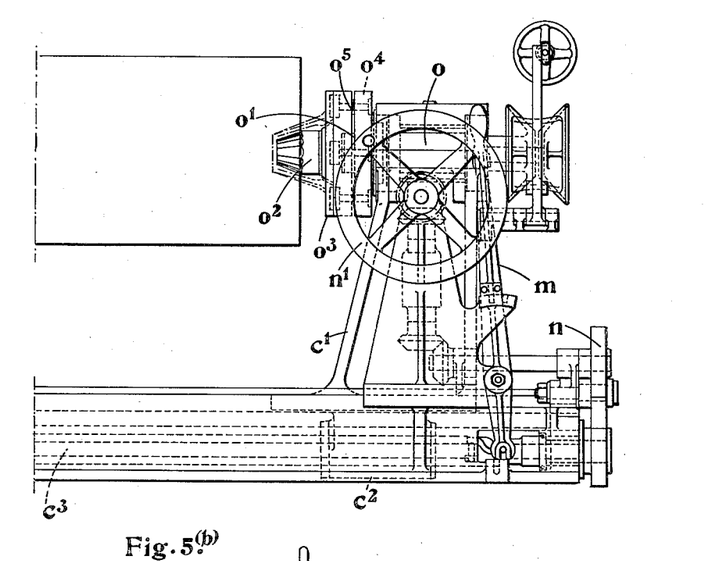
Figure 6:
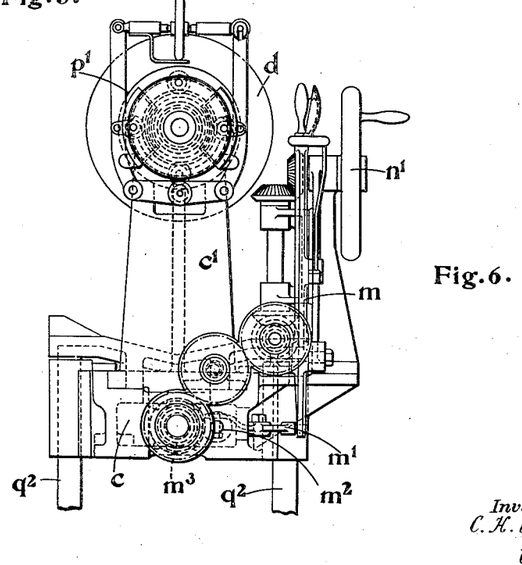
Figure 6 is a side elevation corresponding to Figure 5a, Figure 7 is an elevation of a spiral roll.

In the modified construction of machine represented by Figures 4a–6, the sling yoke for lifting the remnant reel, together with the flexible members supporting the sling yoke and the corresponding capstan drum and its operating gear, are dispensed with, and means are provided for lifting the remnant reel by means of an elevating platform conveniently arranged for operation from an electric motor. Such a construction of machine also permits of the lateral frame parts $b$ of the machine being simplified in construction as is illustrated in Figure 4a.

At the middle of the length of the bedplate $c$ there is provided a substantially rectangular platform $q$ having a longitudinal V-shaped depression in the middle in which the remnant reel may be centered and having stops or projections $q^1$ serving to arrest the remnant reel from moving inwards with respect to the machine. The said platform is supported upon four perpendicular or depending rods $q^2$ passing through suitable bearings formed in plate fittings $q^3$ adapted to be disposed on either side of the bedplate $c$ which carries bearings for transversely disposed spindles $q^4$ which extend through the bedplate to the inner side thereof. The said spindles $q^4$ are fitted with toothed wheels $q^5$ at each side of the bedplate, and on the outer side of the plate fittings $q^3$, for engagement in toothed racks formed on the adjacent sides of the rods $q^2$. The spindles $q^4$ are, on the inner side of the bed plates $c$, geared together in such manner that they will rotate in opposite directions; thus the spindles $q^4$, the toothed wheels $q^5$, and the toothed rods $q^2$, are in mesh together on either side of the bed plate $c$, and rotation of one of the spindles $q^4$ results in vertical movement of the rods $q^2$, carrying the platform $q$ and the remnant reel. A drive is imparted thereto from a reversible electric motor $r$ through a chain drive $r^1$ to a chain wheel $r^2$ mounted upon a worm shaft $r^3$ carried in bearing brackets $s$. The worm shaft $r^3$ serves to drive a worm wheel $q^6$ mounted upon one of the spindles $q^4$. It will be understood that the rods $q^2$ project downwardly below the bedplate $c$ and that the ground surface or floor upon which the bedplate is mounted requires to be formed with a pit or pits into which the said rods may extend. In the use of the platform it will be understood that it is first moved to the lowest position in which it rests upon the plate fittings $q^3$, and upon a remnant reel being disposed thereon in such position as to rest within the longitudinal centering recess, the motor $r$ is energized to drive the worm shaft $r^3$ in the direction to elevate the platform by rotation of the spindles $q^4$ until the remnant reel has been lifted to the extent necessary to bring it into a position co-axial with the cones $c^2$ of the supporting mechanism.

The construction of the machine illustrated in Figures 3–6 is otherwise substantially the same as that of the machine illustrated in Figures 1a to 3, and like reference letters are applied therein to the parts corresponding to those represented in Figures 1a to 3. It will be understood that the platform $q$ may alternatively be adapted for operation hydraulically or mechanically.

I claim:

1. Apparatus for re-reeling webs of paper or other materials from remnant reels comprising in combination a pair of rotatable cones oppositely disposed in line adapted for the support of the remnant reel, pedestals upon which the said cones are respectively mounted, mechanism for effecting the relative movement of the said pedestals and for the bodily movement together of the said pedestals, both movements being effected in the direction of the axis of the said cones, substantially as hereinbefore described.

2. Apparatus for re-reeling webs of paper or other materials from remnant reels comprising rotatable cones for the support of the remnant reel, pedestals upon which the said cones are respectively mounted and means by which the said pedestals are adapted to be adjusted in position together in the direction of the axis of the cones and relatively one to the other at will, substantially as hereinbefore described.

3. Apparatus for re-reeling webs of paper or other materials from remnant reels consisting in combination of rotatable cones for the support of the remnant reel, pedestals upon which the said cones are respectively mounted, elastic means by which the said cones are carried in the said pedestals and means for effecting the relative movement of the said pedestals in the direction of the axis of the said cones, substantially as hereinbefore described.

4. Apparatus for re-reeling webs of paper or other materials from remnant reels comprising in combination a pair of rotatable cones oppositely disposed in line adapted for the support of the remnant reel, pedestals upon which the said cones are respectively mounted, mechanism for effecting the relative movement of the said pedestals in the direction of the axis of the said cones and means for tensioning the web by a roll supported in position by the opposed action of springs, substantially as hereinbefore described.

5. Apparatus for re-reeling webs of paper or other materials from remnant reels comprising in combination a pair of rotatable cones oppositely disposed in line adapted for the support of the remnant reel, pedestals upon which the said cones are respectively mounted, mechanism for effecting the relative movement of the said pedestals in the direction of the axis of the said cones, means for tensioning the web by a roll supported in position by the opposed action of springs and means for the self-alignment of the said roll, substantially as hereinbefore described.

6. Apparatus for re-reeling webs of paper or other materials from remnant reels comprising in combination a pair of rotatable cones oppositely disposed in line adapted for the support of the remnant reel, pedestals upon which the said cones are respectively mounted, mechanism for effecting the relative movement of the said pedestals in the direction of the axis of the said cones and means for re-reeling the unwound web comprising a pair of re-reeling rolls and a re-reeling spindle adapted for movement in a direction away from the re-reeling rolls, substantially as hereinbefore described.

7. Apparatus for re-reeling webs of paper or other materials from remnant reels comprising in combination a pair of rotatable cones oppositely disposed in line adapted for the support of the remnant reel, pedestals upon which the said cones are respectively mounted, mechanism for effecting the relative movement of the said pedestals in the direction of the axis of the said cones and means for re-reeling the unwound web comprising a pair of re-reeling rolls and a re-reeling spindle adapted for movement in a direction away from the re-reeling rolls, the said re-reeling spindle being suspended by flexible members and capstan drums, substantially as hereinbefore described.

8. Apparatus for re-reeling webs of paper or other materials from remnant reels comprising in combination a pair of rotatable cones oppositely disposed in line adapted for the support of the remnant reel, pedestals upon which the said cones are respectively mounted, mechanism for effecting the relative movement of the said pedestals in the direction of the axis of the said cones, and mechanical means for lifting the remnant reels into position between the said cones, substantially as hereinbefore described.

9. Apparatus for re-reeling webs of paper or other materials from remnant reels comprising in combination a pair of rotatable cones oppositely disposed in line adapted for the support of the remnant reel, pedestals upon which the said cones are respectively mounted, mechanism for effecting the relative movement of the said pedestals in the direction of the axis of the said cones and mechanical means for lifting the remnant reels into position for engagement by the cones comprising an elevating platform, substantially as hereinbefore described.

10. Apparatus for re-reeling webs of paper or other materials from remnant reels, comprising in combination a pair of rotatable cones oppositely disposed in line adapted for the support of the remnant reel, pedestals upon which the said cones are respectively mounted, feed screws parallel with the axis of the said cones and in alignment, the said feed screws being respectively engaged with the said pedestals, and mechanism for effecting the independent rotation of the said feed screws, substantially as hereinbefore described.

11. Apparatus for re-reeling webs of paper or other materials from remnant reels, comprising in combination a pair of rotatable cones oppositely disposed in line adapted for the support of the remnant reel, pedestals upon which the said cones are respectively mounted, feed screws parallel with the axis of the said cones and in alignment, the said feed screws being respectively engaged with the said pedestals, mechanism for effecting the independent rotation of the said feed screws, and a clutch adapted to connect the said feed screws one with the other at will, substantially as hereinbefore described.

12. Apparatus for re-reeling webs of paper or other materials from remnant reels, comprising in combination a pair of rotatable cones oppositely disposed in line adapted for the support of the remnant reel, pedestals upon which the said cones are respectively mounted, feed screws parallel with the axis of the said cones and in alignment, the said feed screws being respectively engaged with the said pedestals, mechanism for effecting the independent rotation of the said feed screws, a clutch adapted to connect the said feed screws one with the other at will, and means for throwing in the clutch for operation from the situation of either pedestal, substantially as hereinbefore described.

CLARENCE HAMMOND WEBSTER.